United States Patent
Sumetsky

(10) Patent No.: US 7,266,259 B1
(45) Date of Patent: Sep. 4, 2007

(54) OPTICAL FIBER MICROCOIL, RESONANT STRUCTURE AND METHOD OF MAKING THE SAME

(75) Inventor: Mikhail Sumetsky, Bridgewater, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 0 days.

(21) Appl. No.: 11/019,347

(22) Filed: Dec. 22, 2004

Related U.S. Application Data

(60) Provisional application No. 60/555,994, filed on Mar. 24, 2004.

(51) Int. Cl.
  *G02B 6/00* (2006.01)
  *H01S 3/00* (2006.01)
  *C03B 37/023* (2006.01)

(52) U.S. Cl. .................. 385/12; 385/123; 385/137; 385/136; 359/341.1; 65/385

(58) Field of Classification Search ............. 395/12, 395/147, 134, 135, 136; 65/385; 356/350; 385/12, 123, 147, 134, 135, 136, 137; 359/341.1, 359/341.33, 346
See application file for complete search history.

(56) References Cited

U.S. PATENT DOCUMENTS

| | | | | |
|---|---|---|---|---|
| 4,996,884 A * | 3/1991 | Lessing | ................. | 73/800 |
| 5,917,983 A * | 6/1999 | Page et al. | ................. | 385/134 |
| 6,473,218 B1 | 10/2002 | Maleki et al. | ................. | 359/245 |
| 6,487,233 B2 | 11/2002 | Maleki et al. | ................. | 372/108 |
| 6,488,861 B2 | 12/2002 | Iltchenko et al. | ................. | 216/24 |
| 6,650,821 B1 * | 11/2003 | Koyano et al. | ................. | 385/136 |
| 6,657,731 B2 | 12/2003 | Tapalian et al. | ................. | 356/480 |
| 6,661,950 B1 | 12/2003 | Strecker | ................. | 385/30 |
| 6,707,975 B2 | 3/2004 | Bueschelberger et al. | ................. | 385/123 |
| 6,731,827 B2 | 5/2004 | Lackhart | ................. | 385/12 |
| 2002/0018212 A1 * | 2/2002 | Bennett et al. | ................. | 356/483 |
| 2005/0207713 A1 * | 9/2005 | Mazur et al. | ................. | 385/123 |

OTHER PUBLICATIONS

Vladimir S. Ilchenko, Anatoliy A. Savchenkov, Andrey B. Matsko, and Lute Maleki, "Dispersion Compensation in Whispering-Gallery Modes" vol. 20, No. 1/Jan. 2003/J. Opt. Soc. Am A.

B. E. Little, S. T. Chu, H. A. Haus, J. Foresi and J. P. Laine, "Microring Resonator Channel Dropping Filters" Journal of Lightwave Technology, vol. 15, No. 6, Jun. 1997.

* cited by examiner

*Primary Examiner*—Brian M. Healy
(74) *Attorney, Agent, or Firm*—Wendy W. Koba

(57) ABSTRACT

An optical fiber coil of sub-micron diameter is shown to exhibit self-coupling between adjacent turns so as to form a three-dimensional optical resonator of relatively low loss and high Q. As long as the pitch of the coil and propagating wavelength remain on the same order (or less than) the fiber diameter, resonance may occur. Resonances can be induced by allowing adjacent turns of the coil to touch each other. Optical devices such as resonators and interferometers may then be formed from such "microcoils" that exhibit superior characteristics to conventional planar devices. A method of forming such a microfiber using indirect laser heating is also disclosed.

24 Claims, 6 Drawing Sheets

OPTICAL FIBER MICROCOIL, RESONANT STRUCTURE AND METHOD OF MAKING THE SAME

CROSS REFERENCE TO RELATED APPLICATION

This application claims the benefit of Provisional Application Ser. No. 60/555,994, filed Mar. 24, 2004.

TECHNICAL FIELD

The present invention is related to the formation of microfibers (i.e., fibers having a diameter on the order of one micron or less) and, more particularly, to the utilization of such fibers as three-dimensional, coiled optical devices such as resonators and interferometers (fiber microcoils).

BACKGROUND OF THE INVENTION

A substantial amount of research is currently on-going in the field of optical micro-cavity physics, particularly directed at the ability to develop a high-Q cavity resonator. In general, resonant cavities that can store and re-circulate electromagnetic energy at optical frequencies have many useful applications, including high-precision spectroscopy, signal processing, sensing and filtering. Many difficulties present themselves when conventional planar (two-dimensional) technology, such as etching, is used to fabricate such resonant devices. In particular, the surfaces of such devices need to exhibit deviations on the order of a few nanometers to reduce scattering losses and conventional etching processes cannot routinely form such smoothness. Optical three-dimensional (3D) microcavity resonators, on the other hand, can have quality factors that are several orders of magnitude greater than typical surface etched, 2D resonators, since the microcavity can be shaped by natural surface tension forces during a liquid state fabrication step. The result is a clean, atomically smooth silica surface with low optical loss and negligible scattering.

Optical glass microcavity resonators have quality factors (Q) that are higher by several orders of magnitude than their electromagnetic counterparts. Measured Q's as large as $10^{10}$ have been reported for optical glass microcavities, whereas other types of optical resonators typically have Q's ranging from about $10^5$ to about $10^7$. The high-Q resonances encountered in these microcavities are due to optical whispering-gallery-modes (WGMs) that are supported within the microcavities. For these structures, the high-Q light confinement is caused by total internal reflection from the surface of the cavity. Typically, for asymmetric dielectric cavities of this type, both in 2D and 3D, the high-Q modes are confined near a closed geodesic at the surface of the cavity or near a stable closed optical ray. At times, however, these devices suffer from the problem of overpopulation of the resonant modes, limiting the usefulness of such devices. Moreover, and from a more practical view, the ability to couple light into and out of such WGM devices is extremely difficult to achieve and almost impossible to replicate for manufacturability purposes.

SUMMARY OF THE INVENTION

The present invention addresses issues remaining in the prior art and relates to the formation of an optical fiber having a diameter no greater than the wavelength of the associated electromagnetic field (i.e., for optical communication wavelengths on the order of 1.5 microns, these fibers comprise a diameter of one micron or less), and the utilization of such fibers as three-dimensional coiled optical devices such as resonators and interferometers (fiber microcoils).

In accordance with one aspect of the present invention, a microfiber (i.e., a fiber drawn to a diameter on the order of one micron or less) is fabricated by utilizing a microfurnace in combination with laser heating to draw a fiber with transmission characteristics far superior to those formed using lithographic techniques. The fiber is inserted through the microfurnace (capillary tube) such that the section of the fiber to be heated and drawn remains in the microfurnace. The indirect heating of the fiber allows the use of a laser for heating a section of the capillary tube up to the glass melting temperature. Using the inventive technique, fibers with a diameter of less than 100 nm may be drawn.

A microfiber, formed using the inventive technique, may be wound into a coiled structure ("microcoil") and used, in accordance with the present invention, as an optical resonator or interferometer. In association with the sub-micron diameter of the optical fiber and in contrast to the prior art, light confinement in the inventive coil resonator is achieved by self-coupling between turns, rather than by the presence of a "closed optical path".

In accordance with the present invention, if the diameter of the microfiber is comparable to the radiation wavelength and the pitch of the coil, then coupling between adjacent turns will occur and give rise to high-Q resonances. Advantageously, the process of forming the microfiber allows for biconical input/output tapers to be easily formed on either side of the coil, providing a conventional method for coupling light into and out of the microcoil.

Various aspects of the present invention include the ability to control the Q of the resonant structure through various means, such as by controlling the number of turns in the coil, the pitch of the turns, temperature of the coil, etc. In one embodiment, oscillation can be induced by allowing adjacent turns of the microcoil to touch each other.

Indeed, these and other aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
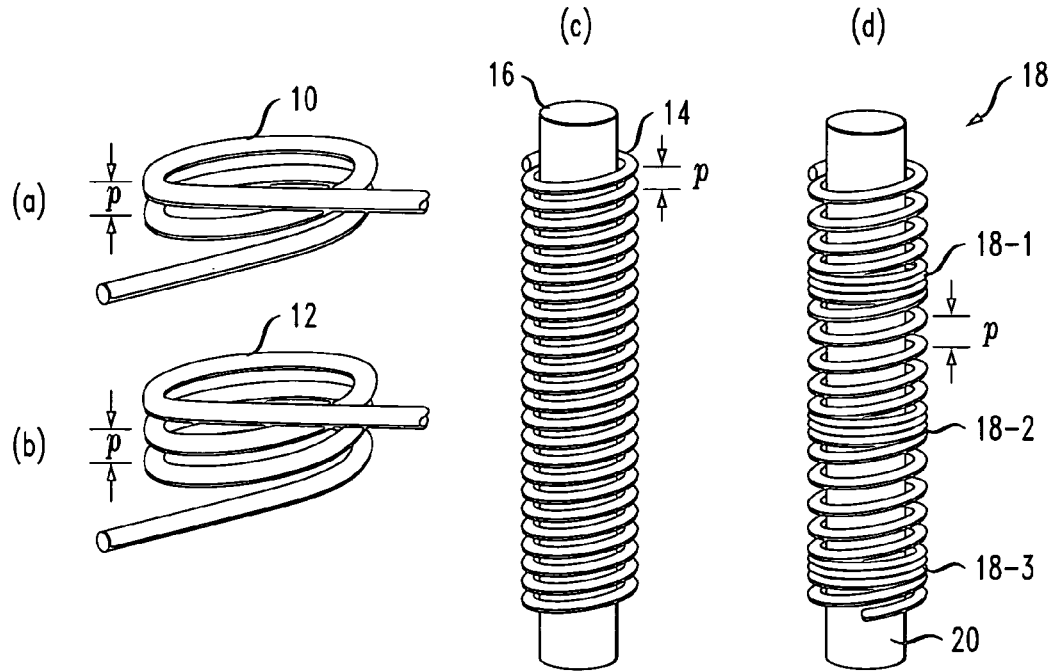
FIG. 1 illustrates various embodiments of a coiled microfiber of the present invention, including a two-turn microfiber coil (FIG. 1(a)), a three-turn microfiber coil (FIG. 1(b)), a multiple turn coil exhibiting a uniform pitch (FIG. 1(c)), and a multiple turn coil exhibiting a non-uniform pitch (FIG. 1(d))

The present invention, as will be described in detail below, proposes the use of a coiled single mode optical microfiber (for the purposes of the present invention, the term "microfiber" is defined as a fiber with a diameter on the order of one micron, or less than (or on the order of) the wavelength of the electromagnetic field), as illustrated in FIGS. 1(*a*)-(*d*), to achieve self-coupling between turns, rather that using a closed loop optical path as in prior art arrangements. In one embodiment, the inventive microfiber coil can be wound around a cylindrical core (e.g., an optical fiber with larger diameter) wound into a self-touching loop, or be formed as a ring node, as in the prior art. The ideal microfiber "coil only" structure, such as those illustrated in FIGS. 1(*a*) and (*b*), can be created if the refractive index of the cylindrical core is low enough and matches the refractive index of the environment.

FIG. 1 illustrates four exemplary microfiber coils (also referred to hereinafter as "microcoils"): (1) a two-turn microcoil 10 in FIG. 1(*a*); (2), a three-turn microcoil 12 in FIG. 1(*b*); (3) a multiple-turn, uniform pitch microcoil 14, wound around an optical fiber 16 having a smaller refractive index in FIG. 1(*c*); and (4) a multiple-turn, non-uniform pitch microcoil 18 wound around an optical fiber 20 in FIG. 1(*d*). Microcoil 18, in this example, is formed to comprise a set of three, separate, resonant structures of relatively narrow pitch (denoted 18-1, 18-2 and 18-3), with sections of coiled fiber having larger pitch disposed therebetween. The pitch P in the transition sections is selected to be large enough such that essentially no coupling between adjacent turns will occur. In accordance with the present invention, under conditions wherein the diameter of the microfiber is comparable to both the wavelength of the propagating signal and the pitch of the coil, strong self-coupling of a microfiber coil, such as any of those shown in FIG. 1, may generate high-Q resonances.

Since a drawn optical fiber will inherently have similar loss characteristics as a whispering gallery mode device (i.e., atomically smooth sidewalls), the significantly larger Q factors can be expected for microfibers with small radius variations. The microcoil resonator of the present invention complements the well-known Fabry-Perot (standing wave) and ring (traveling wave) resonators. In the Fabry-Perot resonator, the resonance is formed by interference of light experiencing multiple reflections from the turning points. In the ring resonator, the resonance is formed by interference of light traveling along the closed path. In the coil resonator of the present invention, the turning points are absent and the light path is open. However, the wave traveling along the open path is circulated on resonant conditions. The resonance is formed by the interference of light going from one turn to another along the microcoil and returning back to the previous turn with the aid of weak coupling. Indeed, it can be shown that a two-turn microcoil formed in accordance with the present invention will exhibit the same free spectrum range as a ring resonator.

In particular, the utilization of sub-micron thickness fiber (microfiber) to form a coil (microcoil) requires that the weak coupling between adjacent turns of the coil to be taken into account. It is assumed that the coupling coefficient K(s) between adjacent turns is adiabatically slow as a function of distance s along the microfiber. This condition can be ensured if the variation of the distance between windings is slow enough. Then, the propagation along the fiber coil is non-reflective and the coil performs as an all-pass filter. In cases where a core is present (such as illustrated in FIGS. 1(*c*) and (*d*)), its effects can be ignored as long as its refractive index matches the index of the environment.

Figure 2:
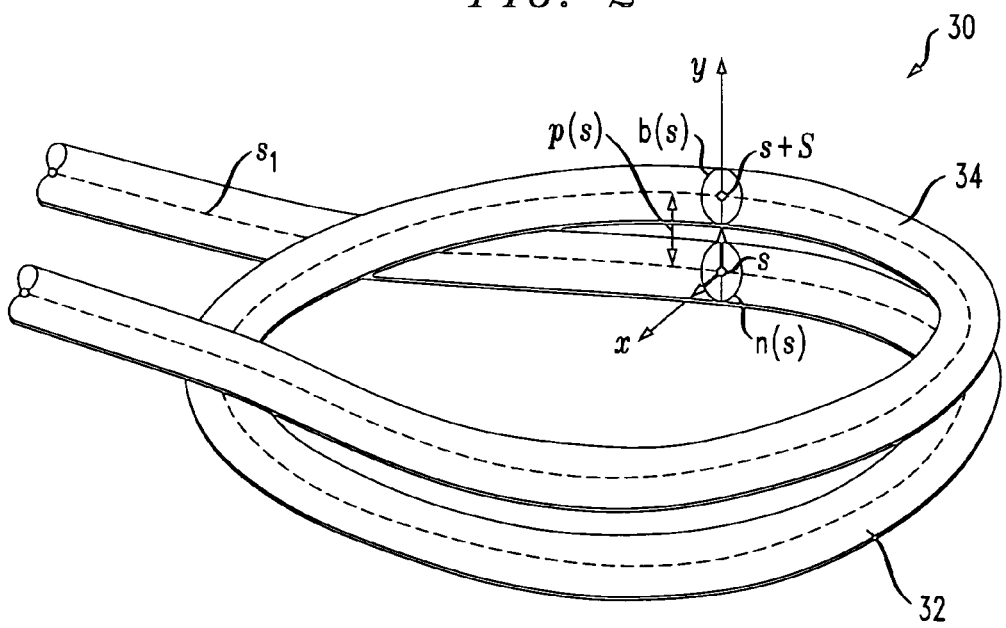
FIG. 2 contains a simplified diagram of a two-turn microfiber coil of the present invention, illustrating the relationship between pitch and coupling.

Self-coupling (i.e., coupling between adjacent turns) will occur in accordance with the present invention when the coil pitch p is comparable to the characteristic transversal dimension of the propagating mode. Usually, this means that the pitch p needs to be comparable to the fiber radius, r, and radiation wavelength, λ. First, consider an idealized coil 30 consisting of two turns, as shown in FIG. 2, where it is assumed that the lower turn 32 and upper turn 34 are close to each other near the point s illustrated on lower turn 32. The point of upper turn 34 adjacent to point s is defined as s+S, where S is the period of the coil. In order to describe the propagating field, an initial point $s_1$ is defined on lower turn 32 where the coupling is negligible. For simplicity, it is presumed that the microfiber is wound on a cylindrical rod so that the centers of lower turn 32 and upper turn 34 have the same x coordinate. Then, the local distance between the fibers can be calculated along the y-axis and is determined by the local pitch of the coil, p(s). Similar to the conventional coupled mode theory, the solution of the vector wave equation having a transversal electric field component can be expressed as:

$$E_t(x,y,s) = A_1(s)\exp(i\beta s)F_0(x,y) + A_2(s)\exp(i\beta s)F_0(x,y-p(s)),$$

where β is the propagation constant and the first and the second terms in this expression represent the field in the lower and upper turns, respectively. After neglecting the terms that are exponentially small in p(s) on the condition of weak coupling and the terms that are small on the condition of relatively slow variation of the coefficients $A_j(s)$, the following coupled equations for the coefficients $A_j(s)$ can be expressed as follows:

$$\frac{\partial}{\partial s}\begin{pmatrix} A_1(s) \\ A_2(s) \end{pmatrix} = i\begin{pmatrix} 0 & \kappa \\ \kappa & 0 \end{pmatrix}\begin{pmatrix} A_1(s) \\ A_2(s) \end{pmatrix}$$

where κ(s) is the coupling coefficient. In this case, the coupled mode equations can be solved exactly for arbitrary κ(s) yielding the transmission coefficient:

$$T(\beta) = \frac{Q_1(\beta)}{Q_1^*(\beta)}, \text{ where } Q_1(\beta) = e^{-i\beta S/2} - ie^{i\beta S/2}\sin(K),\ K = \int \kappa ds,$$

where S is the length of a turn. The group delay, $t_d$, is proportional to the derivative of the phase of T(β) and becomes infinitely large near a resonance condition.

Figure 3:
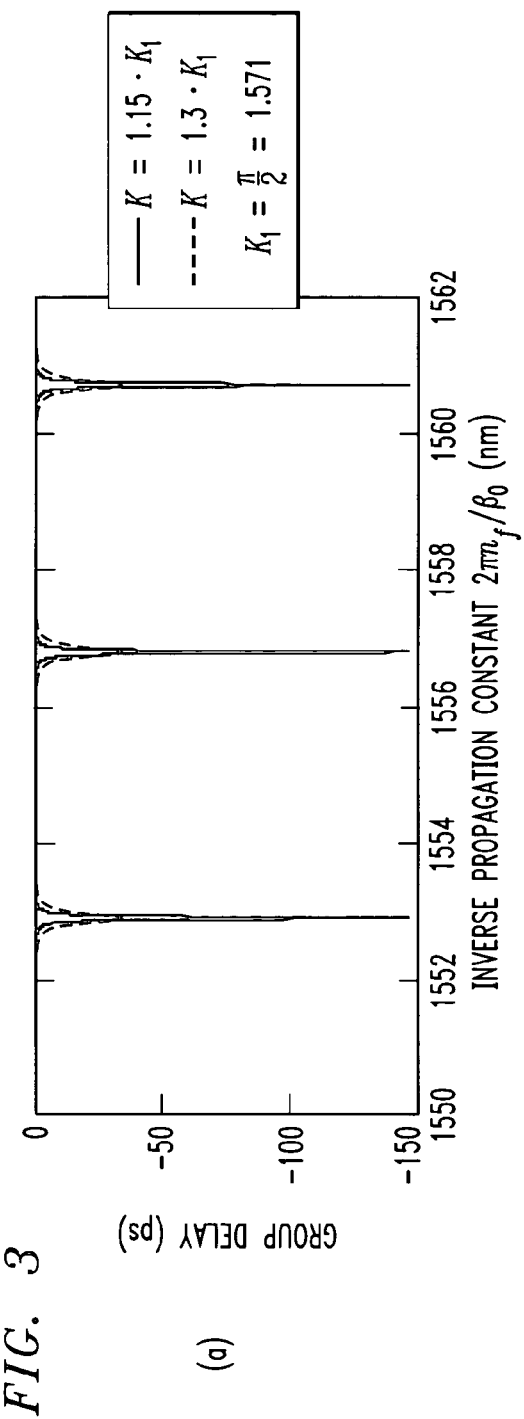
FIG. 3 contains graphs illustrating the dependence of group delay on wavelength for a two-turn coil (FIG. 3(a)) and a three-turn coil (FIG. 3(b))
Figure 3:
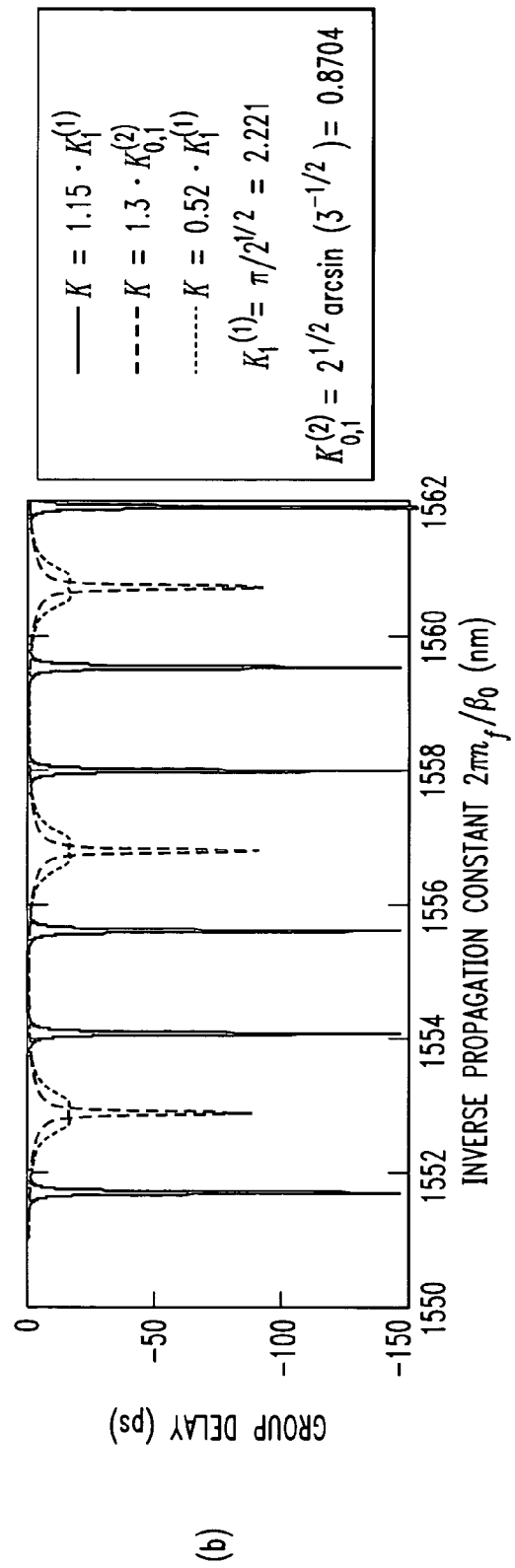

FIG. 3 illustrates the dependence of group delay $t_d$ on the inversed propagation constant $2\pi n/\beta_0$ for an exemplary two-turn coil (FIG. 3(a)) and a three-turn coil (FIG. 3(b)), where $n_f$ is the refractive index of the fiber. The propagation losses are neglected and the dimensionless length of a turn, $\beta_0 S$, is approximately 1600. Referring to FIG. 3(a), the resonance dependencies correspond to the cases when coupling parameter K deviates from the resonant value $K_1=\pi/2$ by $0.3K_1$ (illustrated as the dashed line in FIG. 3(a)) and $0.15K_1$ (illustrated by the solid line in FIG. 3(a)). Correspondingly, the off-resonant group delay equal to 2 ps is enhanced at the resonances to 36 ps with a Q factor of approximately $10^{4.5}$ (dashed line) and to 147 ps with a Q factor of approximately $10^{5.1}$ (solid line).

FIG. 3(b) illustrates the group delay dependencies on the inverse propagation constant for an exemplary three-turn microcoil. It can be shown that the time delay $t_d$ for a three-turn coil becomes infinitely large if one of two below-defined resonant conditions is met. The group delay dependence corresponding to a first type of resonance is demonstrated to be twice as frequent as the two-turn coil discussed above. This structure can thus be interpreted as a pair of two-turn coils, which are coupling to each other. The second type of resonance has the same frequency as the resonances for the two-turn arrangement, where this second type of resonance is due to the presence of the plane of symmetry normal to the axis of the microcoil. In the three-turn coil, the effect of splitting of the group delay peaks as a function of the coupling parameter can be observed, where the plot of FIG. 3(b) shows the group delay near the point of splitting (dotted line).

Generally, the microcoil of the present invention may have multiple turns, as illustrated in FIGS. 1(c) and (d) and, in particular can perform functions similar to conventional multiple-order ring resonators. Such microcoils may comprise non-uniform fiber diameter, variable diameter of turns (enabled, for example, by winding the coil on a tapered rod), variable pitch, or any combination of these parameters, thus allowing for the generation of complex transmission spectra characteristics. As mentioned above and illustrated in FIG. 1(d), the microcoil can consist of several discrete sections of relatively small pitch, separated by sections with larger pitch where coupling is negligible. The transmission coefficient of this multi-stage microcoil is then the product of individual transmission coefficients and the total group delay is the sum of the delay times associated with each section.

Figure 4:
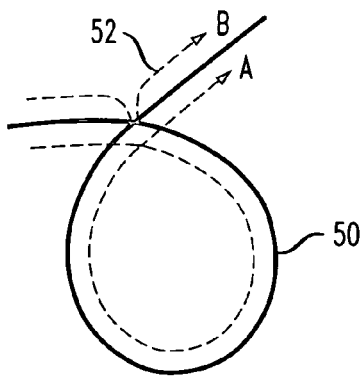
FIG. 4 contains a diagram illustrating the introduction of interference by a self-coupled loop.

The interference phenomenon can be observed in a microcoil of the present invention when a coiled microfiber touches itself ("self-touching") and causes oscillation of the propagating light. FIG. 4 is a simplified diagram useful in understanding this interferometric behavior and illustrates a first beam A as propagating along a loop 50 and second beam B as propagating only through the self-coupling region 52, bypassing loop 50. If the amplitudes of beams A and B are close, and their phases are opposite, the beams will cancel each other. In this case of self-coupling, which is known as the condition of critical coupling, the oscillations of the power spectrum of the light transmitted through the loop will display a large number of maxima and minima, and the loop will function as a three-dimensional optical interferometer.

Figure 5:
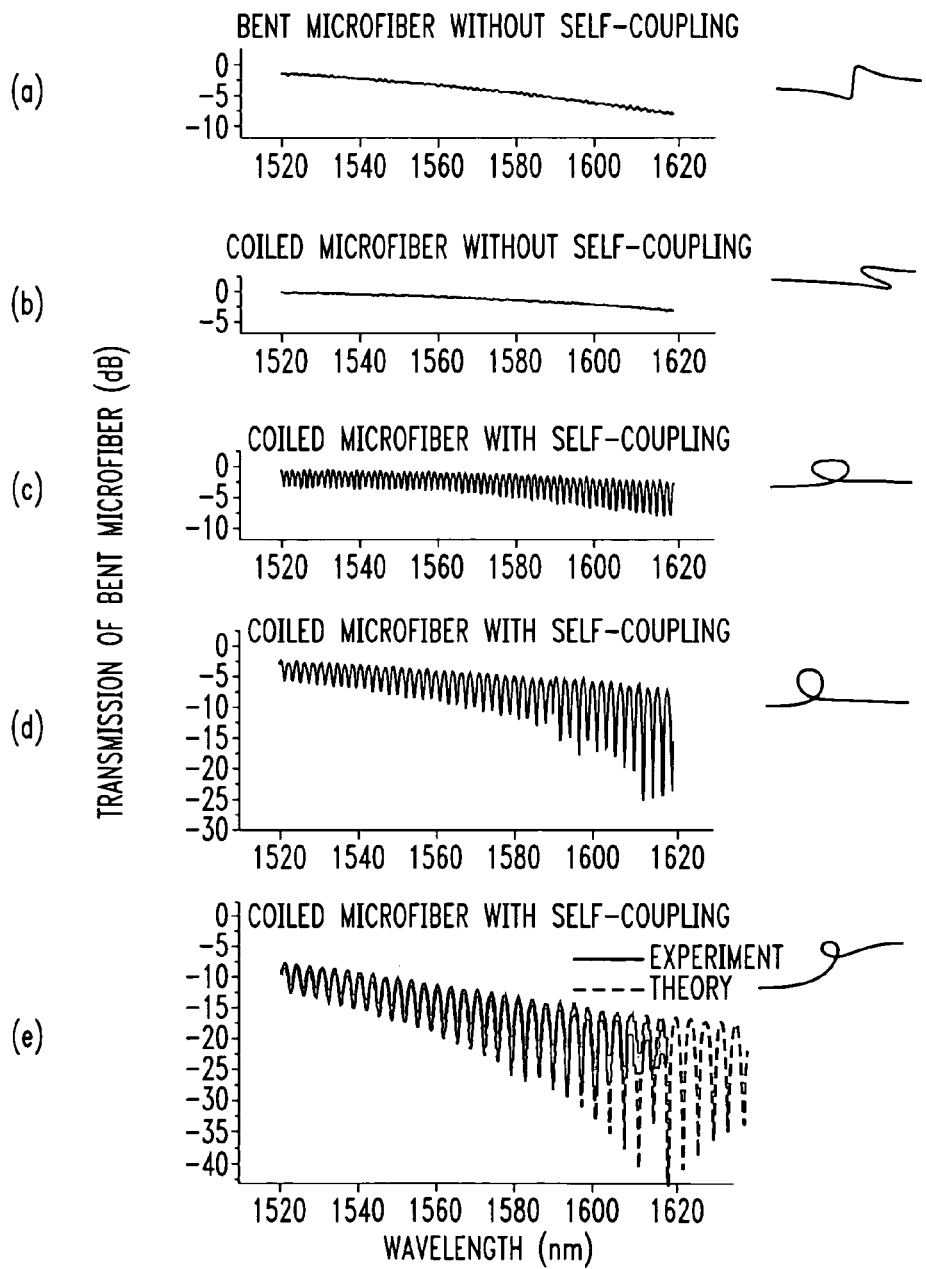
FIG. 5 illustrates the transmission spectra for various "bent" and "looped" microfiber coils of the present invention, illustrated variously in FIGS. 5(a)-(e)

FIG. 5 contains a series of experimentally observed transmission spectra, illustrating the resonances under both conditions of no self-touching (FIGS. 5(a) and (b)), and self-touching (FIGS. 5(c)-(e)), the self-touching associated with the act of bringing the fiber coil in physical contact between turns, as discussed above in association with FIG. 4. The initial step of creating a "bend" in a microfiber (such as, for example, by moving the taper ends towards each other) as shown in FIG. 5(a), generates strong bending losses growing from 1.5 to 7.5 dB in the optical bandwidth range of interest. Further translation, as illustrated in FIG. 5(b), creates a less-bent loop exhibiting smaller bending losses. When the "loop" is then moved to touch itself, as illustrated in FIG. 5(c), self-touching oscillations in the transmission spectrum can be observed. The maximum magnitude of the oscillations in the bandwidth range of interest is approximately 5 dB, achieved at a center wavelength of about 1620 nm. Further constricting the loop, while preserving physical contact, is shown to reduce the amplitude of the oscillations. For example, as shown in FIG. 5(d), the maximum magnitude of oscillations achieved for the same center wavelength of 1620 nm is about 18 dB, and for the arrangement of FIG. 5(e), this amplitude reduction drops further to approximately 25 dB.

Figure 6:
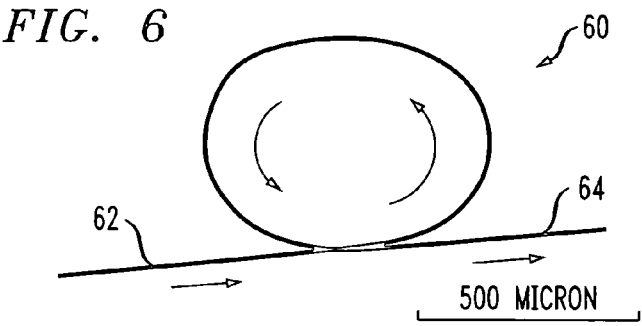
FIG. 6 contains an illustration of an alternative embodiment of a self-coupling loop, the loop having input and output sections formed to be essentially parallel.
Figure 7:
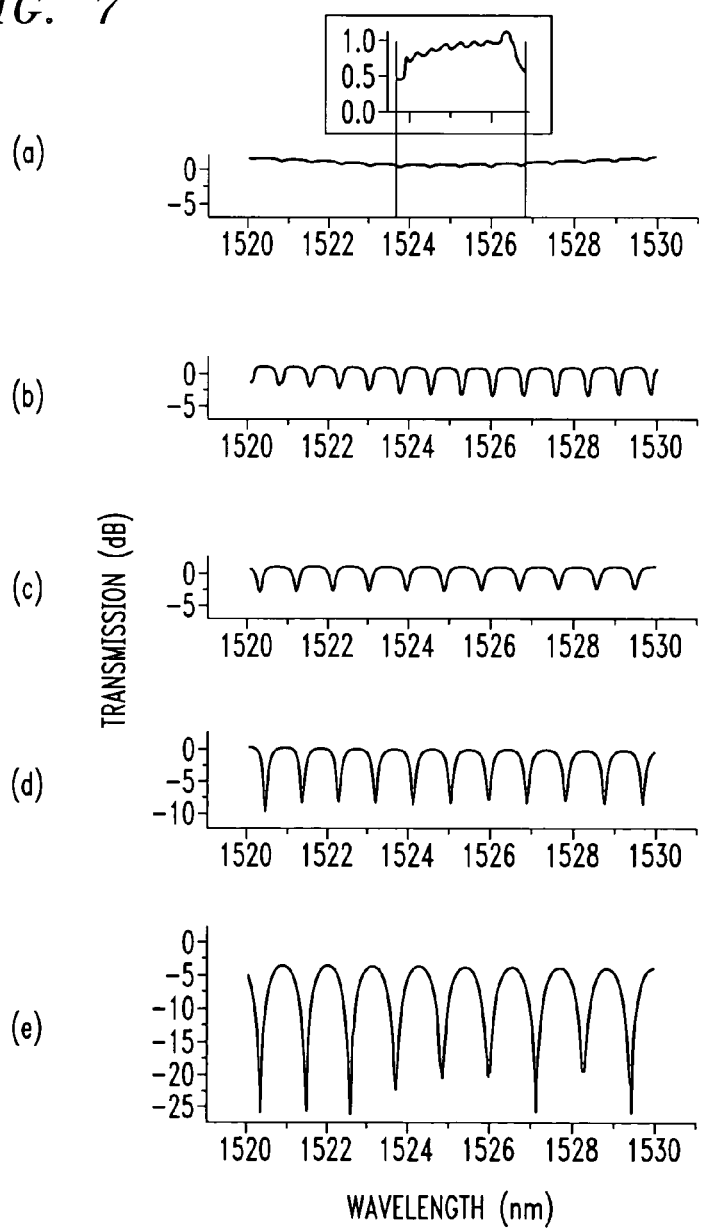
FIG. 7 illustrates the transmission spectra associated with the self-coupling loop of FIG. 6.

FIG. 6 contains an optical microscope image of an exemplary self-coupling loop which is significantly less lossy than that associated with the diagrams of FIG. 5. In particular, the loop as shown in FIG. 6 is created of a more uniform microfiber, and has its input and output ends disposed to be parallel so that the light traveling along the loop can make several turns without experiencing significant loss. FIG. 7 is an illustration of the transmission spectra for the loop of FIG. 6, where the well-pronounced resonance dips in the transmission spectra are clearly visible.

It is well known that drawing of very thin microfibers using direct heating from a laser source is impossible. Indeed, the minimum diameter of a microfiber formed by directly heating the fiber with a laser source is known to be limited by the power of the beam. In particular, for a microfiber heated with a $CO_2$ laser, the power acquired from the laser beam is proportional to the volume of the fiber (i.e., the acquired power drops as a function of the fiber radius squared). At the same time, the power dissipated by the fiber is proportional to the surface area of the fiber (i.e., the dissipated power drops linearly with fiber radius). Therefore, at a certain radius, the dissipated power will equal the acquired power and melting of the fiber is no longer possible; the fiber "freezes" for this radial value.

An inventive arrangement for drawing sub-micron thin optical fibers (microfibers) in accordance with the present invention overcomes this limitation of the prior art by using indirect heating of the optical fiber. That is, the section of the fiber to be drawn is placed within a capillary tube (referred to hereinafter as a "microfurnace"), and the tube itself is heated with the laser source. The radiated heat from the laser then functions to melt the fiber and allow sub-micron drawing to occur.

Figure 8:
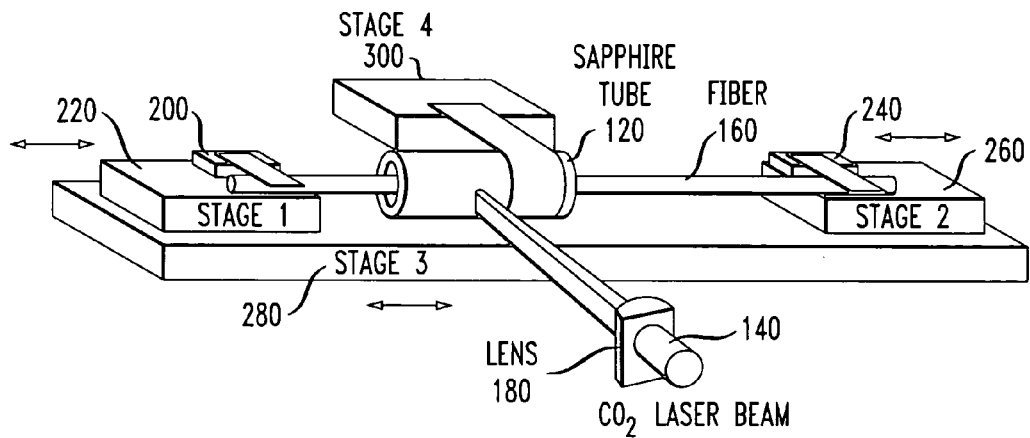
FIG. 8 contains an exemplary arrangement, including a microfurnace, useful in forming the microfiber structure of the present invention.

An exemplary arrangement 100 for fabricating sub-micron diameter optical fibers ("microfibers") in accordance with the present invention that utilizes laser heating while overcoming this "freezing" problem is illustrated in FIG. 8. As shown, arrangement 100 utilizes a microfurnace 120 in conjunction with a laser heat source 140 to melt and draw a section of fiber 160. In a preferred embodiment, microfurnace 120 comprises a sapphire capillary which is efficient in both capturing and spreading the impinging beam from laser source 140. In one embodiment, the sapphire capillary may comprise an outer diameter of 0.9 mm and an inner diameter of 0.6 mm. In another embodiment, the sapphire capillary can be replaced by any other suitable material (and perhaps having a physical design other than a capillary), the material having a melting temperature high enough for the purposes of the present invention. For example, it may be convenient to open the capillary from its side by making a cut parallel to the capillary axis, which simplifies the release of the microfiber after drawing is complete. It is to be understood, however, that the material comprising the microfurnace, while heated with a laser, must be situated close enough to the drawn fiber to maintain the desired melting temperature.

In the arrangement of FIG. 8, a lens 180 is included to control the laser beam size and focus as it impinges microfurnace 120. Arrangement 100 may be operated, for example, by displacement of four separate translation stages, as shown, which allow for the fabrication of the biconical input/output tapers, as well as for the microfiber itself. Referring to FIG. 8, a first end portion 200 of fiber 160 is fixed to a first translation stage 220 which allows first end portion 200 to be moved along the direction of the optical axis. A second end portion 240 of fiber 160 is fixed to a similar second translation stage 260. A third, table stage 280 can be used to translate the fiber as a whole with respect to laser source 140. A fourth stage 300 governs the displacement of microfurnace 120 with respect to the portion of fiber 160 being heated. Indeed, stage 300 allows for the removal of microfurnace 120 from the tapered fiber segment once the drawing is completed. Indeed, the use of a movable/translatable drawing arrangement allows for well-known feedback techniques to be employed (e.g., monitoring the power of an optical signal passing through the fiber) to control the draw process and obtain as precisely as possible the desired sub-micron diameter.

Figure 9:
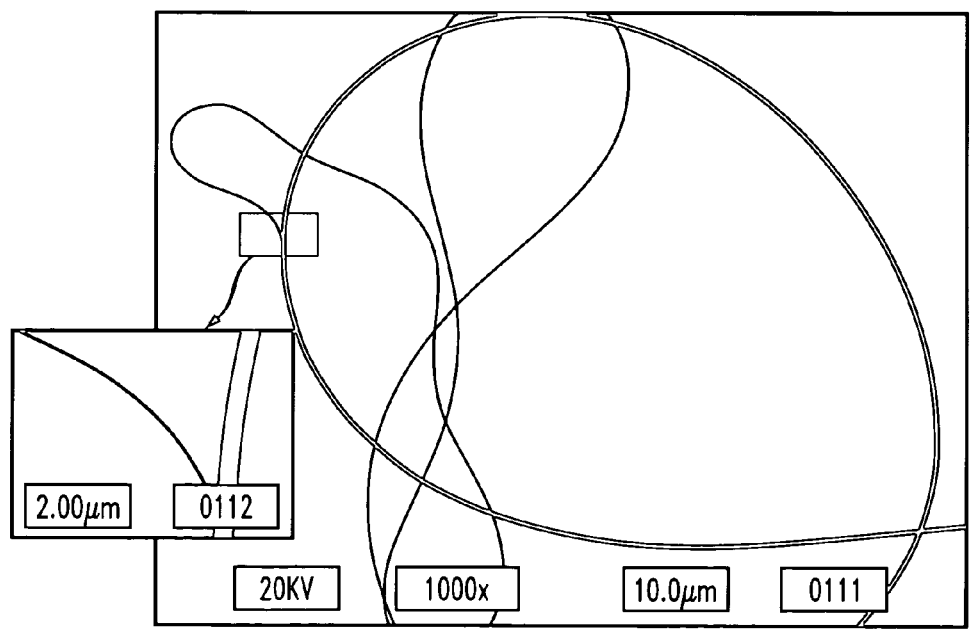
FIG. 9 contains an SEM image of an actual microfiber that was drawn using a microfurnace arrangement.

In accordance with the present invention, the mass of the portion of fiber 160 within microfurnace 120 (the "melting fiber") is much less than the mass of the corresponding heated section of microfurnace 120. Therefore, the temperature inside the microfurnace is not affected by the variation in fiber radius as the fiber is being drawn, allowing for the drawing process to be continued until the desired sub-micron diameter is achieved. The use of microfurnace 120, therefore, decouples the affects associated with the fiber from the heat source itself. FIG. 9 contains an SEM image of a microfiber drawn from a conventional optical fiber by translation of only first stage 220. The diameter of the portion of the microfiber shown in this illustration varies from 700 nm to less than 100 nm. As an alternative, the drawing operation of the present invention may take place in a vacuum to avoid the freezing problem of the prior art, since heat dissipation from the fiber will not be affected by the ambient.

Figure 10:
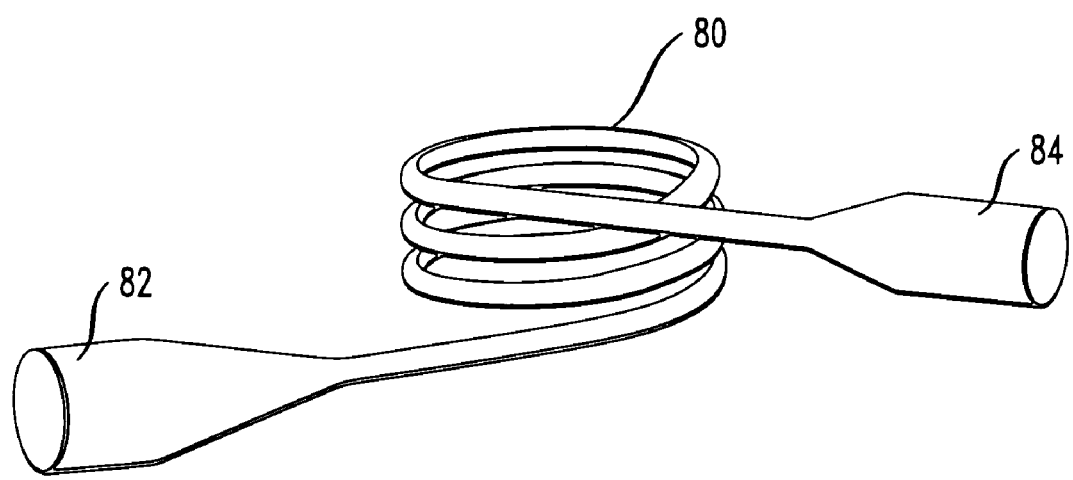
FIG. 10 illustrates an exemplary microfiber coil that may be fabricated from a conventional biconical tapered fiber, using the arrangement of FIG. 8 to form the microfiber portion, while maintaining biconical end portions for efficient light coupling.

Coiled microfiber resonators of the present invention exhibit several advantages over the 2D rings and 3D WGMs of the prior art, with a primary advantage being the relatively simple ability to couple signals into and out of the microcoil by using a pair of adiabatic tapers, as illustrated in FIG. 10. As shown, an exemplary microcoil resonator 80 is formed to include a biconical input taper 82 and a biconical output taper 84. Since these tapers may be formed during the same draw process used to form the microfiber itself, essentially no coupling loss is observed.

Additionally, since the microfiber is fabricated by melting, a microcoil formed from such a fiber will exhibit atomically flat surfaces in the same manner as WGM devices. Being fabricated of a single mode fiber, the microcoil has a one-dimensional resonant structure and does not exhibit the problem of overloading of the resonant modes, as found in 3D WGM microcavities.

While the present invention has been particularly described and shown with reference to particular embodiments and methods of fabrication, it should be understood by those skilled in the art that various changes in form and detail may be made therein without departing from the spirit and scope of the present invention as defined by the claims appended hereto.

What is claimed is:

1. An optical device comprising a three-dimensional optical fiber coil of at least a pair of turns, the fiber coil exhibiting a diameter no greater than the wavelength of the electromagnetic field propagating through the optical device, wherein the pitch of the coil is defined as the spacing between adjacent turns and is maintained to be on the order of the fiber diameter so as to provide self-coupling of a propagating optical signal between adjacent turns.

2. An optical device as defined in claim 1 wherein self-coupling of the propagating optical signal between adjacent turns occurs for signal wavelengths on the same order as the fiber diameter and pitch, creating a high-Q cavity.

3. An optical device as defined in claim 1 wherein the pitch is essentially constant between adjacent turns.

4. An optical device as defined in claim 1 wherein the pitch is non-uniform between adjacent turns.

5. An optical device as defined in claim 1 wherein the three-dimensional optical fiber coil is wound on a rod having a refractive index less than the three-dimensional optical fiber coil.

6. An optical device as defined in claim 5 wherein the rod comprises a section of optical fiber of diameter no less than the wavelength of the electromagnetic field propagating through the three-dimensional optical fiber coil.

7. An optical device as defined in claim 1 wherein the device comprises a plurality of resonators, the resonators separated by sections of optical fiber coil having a pitch greater than the resonator pitch such that self-coupling does not occur in the sections between adjacent resonators.

8. An optical device as defined in claim 1 wherein the three-dimensional optical fiber coil comprises an essentially constant diameter.

9. An optical device as defined in claim 1 wherein the three-dimensional optical fiber coil comprises a non-uniform diameter.

10. An optical device as defined in claim 1 wherein the device comprises at least one turn of the three-dimensional optical fiber coil being in physical contact with an adjacent turn so as to form an optical interferometer.

11. An optical device as defined in claim 1 wherein the device comprises at least one turn of the three-dimensional optical fiber coil being in physical contact with an adjacent turn so as to form an optical resonator.

12. An optical device as defined in claim 1 wherein the ambient temperature of the three-dimensional optical fiber coil is adjusted to provide optical wavelength tuning.

13. A method of forming an optical fiber having a diameter no greater than the wavelength of the electromagnetic field propagating therethrough, the method comprising the steps of:
  a) obtaining an optical fiber of conventional diameter;
  b) inserting the optical fiber through a capillary tube of dimensions sufficient to allow for the fiber to move freely within the tube;
  c) fixing at least one end of the fiber to an axial translation stage;
  d) applying heat to the capillary tube sufficient to initiate melting of the section of fiber within the tube; and
  e) applying a pulling force to the fixed end of the fiber to draw the melting fiber until the predetermined desired sub-micron diameter is obtained.

14. The method as defined in claim 13, wherein the method further comprises the step of;
   f) monitoring the optical signal passing through the fiber during the drawing process of step e), and adjusting the pulling force and/or rate as a function of the optical signal.

15. The method as defined in claim 13, wherein in performing step b), a sapphire capillary tube is used.

16. The method as defined in claim 15 wherein the sapphire tube has an inner diameter on the order of 1.0 mm.

17. The method as defined in claim 13, wherein in performing step c), opposing ends of the fiber are both fixed to axial translation stages, such that either end or both ends may be pulled to draw the fiber.

18. The method as defined in claim 13 wherein in performing step d), a laser is used as a heat source to raise the temperature of the capillary tube and thus indirectly heat the fiber.

19. The method as defined in claim 18 wherein a $CO_2$ laser is used as the heat source.

20. The method as defined in claim 18 wherein a focusing lens is inserted in the path between the laser and the capillary tube to define the beam shape intercepting the tube.

21. The method as defined in claim 13 wherein in performing step d), the capillary tube is rotated to provide for more uniform heating in the radial direction.

22. The method as defined in claim 13, wherein in performing step d), the heat source is moved relative to the capillary tube to provide for mole uniform heating in the axial direction.

23. The method as defined in claim 13, wherein in performing step b), a different material, having a shape different from a capillary tube, is used as a microfurnace to house the optical fiber during the heating and pulling steps.

24. An optical device as defined in claim 1 wherein the optical fiber coil is used for sensing changes in the ambient environmental conditions as associated with changes in the effective refractive index on the optical fiber coil and indicated by changes in it's associated transmission spectrum.

* * * * *